Jan. 17, 1967  F. RÜMPELEIN ETAL  3,298,293
LIGHT METER ASSEMBLY FOR PHOTOGRAPHIC CAMERAS
Filed March 16, 1964  2 Sheets-Sheet 1

INVENTOR.
FRITZ RÜMPELEIN
PAUL KOPF
BY

Jan. 17, 1967   F. RÜMPELEIN ET AL   3,298,293
LIGHT METER ASSEMBLY FOR PHOTOGRAPHIC CAMERAS
Filed March 16, 1964   2 Sheets-Sheet 2
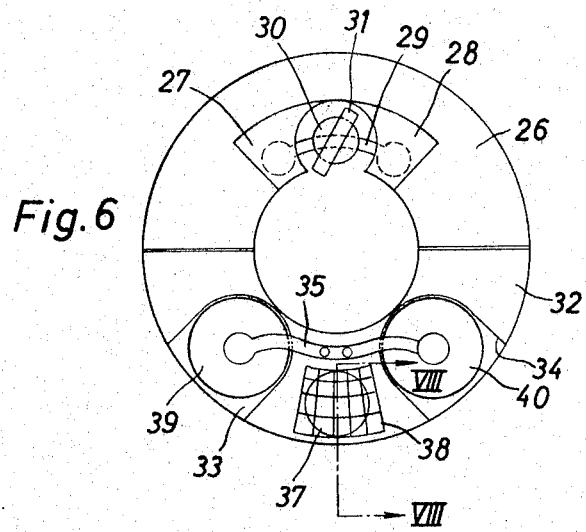
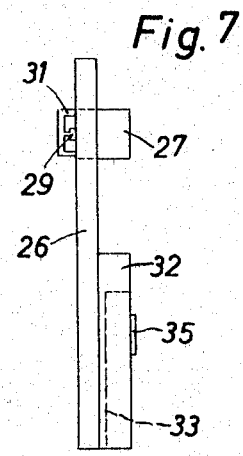
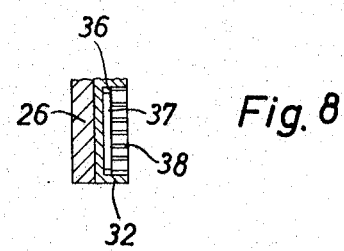
INVENTOR.
FRITZ RÜMPELEIN
PAUL KOPF
BY 3,298,293
LIGHT METER ASSEMBLY FOR
PHOTOGRAPHIC CAMERAS
Fritz Rümpelein, Munich, and Paul Kopf, Unterhaching, Germany, assignors to Agfa Aktiengesellschaft, Leverkusen, Germany
Filed Mar. 16, 1964, Ser. No. 351,911
Claims priority, application Germany, Mar. 15, 1963, A 42,610
2 Claims. (Cl. 95—10)

The present invention relates to light meters.

More particularly, the present invention relates to light meters which are built into cameras.

In particular, the present invention relates to that type of light meter which can be incorporated into the objective assembly of the camera.

One of the primary objects of the present invention is to provide an exceedingly simple construction of this type which can be mounted within the housing of a shutter which is of the between-the-lens type.

A further object of the present invention is to provide a light meter assembly which forms a separate unit so that it can be built and tested separately from the remainder of the camera and also so that it can, when necessary, be removed as a unit from the camera for repair purposes.

Also it is an object of the present invention to provide a light meter assembly of the above type which will occupy an extremely small amount of space.

Furthermore, it is an object of the invention to provide a light meter assembly which can be incorporated into existing shutters without any major reconstruction of the existing shutters so that in this way the light meter assembly of the invention can be combined with shutters which were not originally designed to have light meter assemblies combined therewith.

With these objects in view the invention includes in a light meter assembly which is adapted to be mounted within the housing of a between-the-lens shutter, a pair of permanent magnets which define between themselves a space which is adapted to receive a moving coil, and a magnetic member carrying these magnets and being arranged therewith along a circle the center of which is in the optical axis, this member which carries the permanent magnets also carrying a photosensitive means which responds to the lighting conditions, so that in this way an extremely simple and compact assembly capable of conveniently being arranged around the optical axis is provided.

The novel features which are considered as characteristic for the invention are set forth in particular in the appended claims. The invention itself, however, both as to its construction and its method of operating, together with additional objects and advantages thereof, will be best understood from the following description of specific embodiments when read in connection with the accompanying drawings, in which:

FIG. 6 is a front elevation of a third embodiment of a structure according to the present invention;

FIG. 7 is a side view of the structure of FIG. 6; and

FIG. 8 is a transverse section of the structure of FIG. 6 taken along line VIII—VIII of FIG. 6 in the direction of the arrows.

Figure 1:
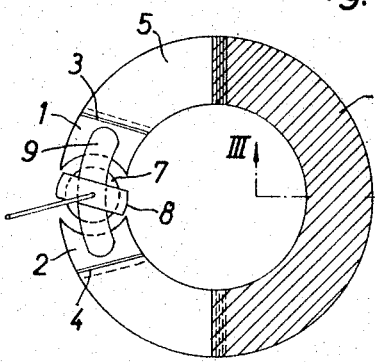
FIG. 1 is a front elevation of one possible embodiment of a structure according to the present invention.
Figure 2:
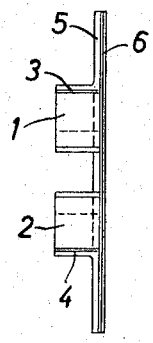
FIG. 2 is a side view of the structure of FIG. 1.

According to the embodiment of the invention which is illustrated in FIG. 1 there are a pair of relatively short permanent magnets 1 and 2 which have concave end faces directed toward and spaced from each other and which are fixed at their end faces which are directed away from each other to the ends 3 and 4 of a magnetic member 5. The magnetic member 5 is quite thin, as is apparent from FIG. 2, and the ends 3 and 4 thereof are bent out of the plane of the remainder of the member 5, substantially at a right angle thereto, and the permanent magnets 1 and 2 are fixed to the ends 3 and 4, respectively, as being soldered thereto. The reference to member 5 as being magnetic signifies that the flux of the magnets 1 and 2 flows readily therethrough, and it is apparent that with this construction the member 5 forms a magnetic return path for the lines of flux of the permanent magnets 1 and 2. Moreover, the magnetic member 5 and the permanent magnets 1 and 2 carried thereby are arranged along a circle which surrounds the optical axis and of course the center of the circle is located in the optical axis, the size of the parts being such that the entire assembly shown in FIG. 1 can be conveniently mounted within the housing of a between-the-lens shutter. The member 5 itself carries the layers of material which form a photosensitive means 6 which can be a photocell, for example, and thus the member 5 itself forms the metal backing for the photosensitive means 6. The material which forms the photosensitive means 6 can be mounted on the member 5 as, for example, by a vapor deposition process.

The space between the concavely curved end faces of the permanent magnets 1 and 2 accommodates a core 7 and a moving coil 8 of the light meter assembly. The core 7 is stationary and is fixedly carried by a bridging element 9 which is fixed at its ends to the permanent magnets 1 and 2, respectively, as by being glued thereto. The bridge elements 9 and the core 7 are provided with bearing recesses or the like for participating in the support of the moving coil so that the latter is free to turn in a manner well known in the art to positions called for by the lighting conditions, and any suitable indicator such as a pointer or the like may be connected to the moving coil 8 for turning movement therewith. The photosensitive means 6 is connected with the moving coil 8 in an electrical manner well known in the art.

Figure 3:
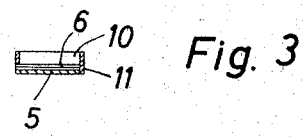
FIG. 3 is a transverse section of the structure of FIG. 1 taken along line III—III of FIG. 1 in the direction of the arrows.

As is particularly apparent from FIG. 3, a honeycomb grid 10 can be arranged in front of the photosensitive means 6 of the magnetic member 5, and this grid can be glued to the photosensitive means 6 or the portion 11 of the grid 10 can extend downwardly, as viewed in FIG. 3, beyond the remainder of the grid 10 so as to adjoin a peripheral edge portion of the magnetic member 5 to which this portion 11 of the grid 10 can be soldered for the purpose of mounting the grid 10 in position in front of the photosensitive means 6.

Figure 4:
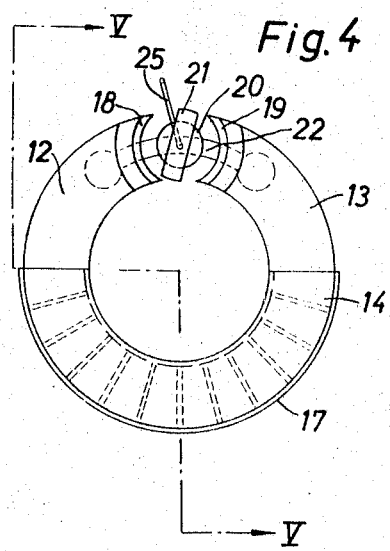
FIG. 4 is a rear elevation of another embodiment of a structure according to the invention.
Figure 5:
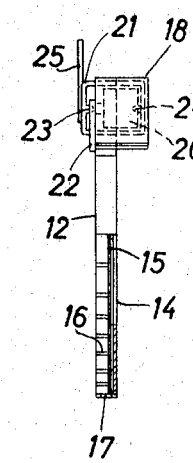
FIG. 5 is a partly sectional illustration of the structure of FIG. 4 taken along line V—V of FIG. 4 in the direction of the arrows.

According to the embodiment of the invention which is illustrated in FIGS. 4 and 5 there are also a pair of permanent magnets 12 and 13 which are fixedly carried by a magnetic member 14 as by being soldered thereto, and it is apparent that the elements 12–14 are arranged along a circle the center of which coincides with the optical axis so that the assembly can conveniently be situated within the housing of a between-the-lens shutter. As is shown in FIG. 5 the magnetic member 14 can also have a photosensitive means mounted thereon as by having the layers of the photosensitive material 15 deposited by vapor deposition on the member 14 so that the latter forms the metal backing of the photosensitive means. The member 14 thus forms a magnetic return flow path for the lines of flux the permanent magnets 12 and 13 and of course the photosensitive means will be electrically connected in a known way to the moving coil 21 of the structure which is located between the permanent magnets 12 and 13. A honeycomb grid 16 is located in front of the photosensitive means 15 and it may also be mounted as by having an outer flange portion 17 which is wider than the remainder of the honeycomb grid situated in a position adjoining a peripheral portion of the magnetic member 14 to which the flange 17 can be soldered, for example, for the purpose of fixedly mounting the honeycomb grid 16. It is to be noted, as shown particularly in FIG. 5, that the total thickness of the magnetic member 14, the photosensitive means 15, and the honeycomb grid 16 does not exceed the thickness of the permanent magnets 12 and 13.

The free ends of the permanent magnets 12 and 13 fixedly carry pole shoes 18 and 19 which are fixed to the permanent magnets as by being soldered thereto, and the concave end faces of the pole shoes 18 and 19 define between themselves a space in which is situated the fixed core 20 and the moving coil 21. In a manner similar to the embodiment of FIGS. 1–3 the core 20 is fixedly mounted with respect to the permanent magnets 12 and 13 by way of a bridging member 22 which extends across the gap between the pole shoes 18 and 19 and which is fixed at its ends to the permanent magnets 12 and 13. The bridge 22 and core 20 have bearing elements which participate in the support of the moving coil 21. As is apparent from FIG. 5 the moving coil assembly 21 is provided with pointed projections 23 and 24 directed inwardly toward each other and received in suitable conical recesses in the bridging member 22 and core 20 so that in this way the moving coil is supported for rotary movement. Moreover, the moving coil carries a pointer 25 or the like for the purpose of indicating the lighting conditions or so as to be available to be scanned so that an automatic structure can respond to the lighting conditions in the manner well known in the art.

In the embodiment of the invention which is illustrated in FIGS. 6–8, the magnetic member 26 is in the form of a complete ring which at its inner periphery is formed with a cutout in which are mounted the permanent magnets 27 and 28 which have concave end faces directed toward each other and defining between themselves the space which receives the core 30, carried by the bridging member 29 which is fixed to the permanent magnets 27 and 28, and the moving coil 31 which can be identical with any of the moving coils described above. Thus, in this case the complete ring 26 will also form a magnetic return flow path for the lines of flux of the permanent magnets 27 and 28 and again all of the structure is arranged along a circle whose center is in the optical axis and can conveniently be mounted within the housing of a between-the-lens shutter.

In this embodiment approximately one half of the ring 26 carries a carrier plate 32 made of a plastic material which is not electrically conductive, and this plastic plate 32 may be glued to the ring 26, for example, the plate 32 having an approximately hemispherical configuration, as is apparent from FIG. 6, this member 32 having inner and outer peripheries which correspond with and are aligned with inner and outer peripheries of the ring 26 along the portion thereof which carries the plate 32. This plate 32 is formed with a pair of cutouts in the form of guide notches 33 and 34 which extend inwardly from the outer periphery of the plate 32. Between these guide notches 33 and 34 the carrier plate 32 fixedly carries an elongated electrically conductive leaf spring 35 which may, for example, be riveted to the plate 32 and this leaf spring 35 cooperates with plate 32 to form a means for releasably holding a source of current in position, and in addition the spring 35 forms part of the electrical circuit. Thus, it will be seen that there are arranged within the guide notches 33 and 34 a pair of small circular cells 39 and 40 which form the current sources, as is apparent from FIG. 6, and the free ends of the leaf spring 35 press against the cells 39 and 40 to maintain them in the illustrated position within the guide notches 33 and 34 as well as to be electrically connected therewith. Since the guide notches extend inwardly from the outer periphery of the member 32 the cells 39 and 40 can very easily be slipped into the illustrated positions from the outer ends of the notches 33 and 34, and the ends of the spring 35 press substantially in the direction of the optical axis against the cells 39 and 40 to maintain them in position. The electrically conductive holding spring 35 is connected in an unillustrated manner electrically with one end of the winding of the moving coil 31.

The carrier 32 is formed with a further cutout 36, shown also in FIG. 8, in which is located a photosensitive resistor 37 which forms the photosensitive means of this embodiment, and arranged in front of the photosensitive resistor 37 is also a honeycomb grid 38 which is fixed with the carrier 32. Thus, the sources of current 39 and 40 are connected also through unillustrated conductors with the photosensitive resistor 37 and with the other end of the winding of the moving coil 31.

Naturally the invention is not limited to the details referred to above and shown in the drawings. The important feature of the invention is that the permanent magnets together with the magnetic member which carries the permanent magnets and also together with the photosensitive means form a single unitary substantially ring-shaped sub-assembly on which the moving coil can be mounted for rotary movement so that this complete light meter assembly can be manufactured independently of the shutter itself and of course can be independently tested before being combined with the remainder of the shutter assembly.

It will be understood that each of the elements described above, or two or more together, may also find a useful application in other types of light meters differing from the types described above.

While the invention has been illustrated and described as embodied in light meters to be mounted in shutter housings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a light meter assembly which is adapted to be mounted within the housing of a between-the-lens shutter for a lens having an optical axis, in combination, a pair of permanent magnets; a moving coil located between said pair of permanent magnets; a magnetic member carrying said magnets and forming a magnetic return path for the flux thereof, said magnetic member and said magnets being arranged along at least part of a circle which concentrically surrounds the optical axis; a photosensitive resistor carried by said magnetic member; holding means also carried by said magnetic member and formed with a notch which extends to an outer peripheral portion of said holding means; a source of current located in said notch and carried by said holding means; and an electrically conductive leaf spring carried by said holding means, electrically connected with said source of current, and pressing against the latter in a direction substantially parallel to the optical axis for maintaining said source of current in said notch of said holding means.

2. In a light meter assembly which is adapted to be mounted within the housing of a between-the-lens shutter for a lens having an optical axis, in combination, a circular magnetic member adapted to be positioned within the shutter housing in a position concentrically surrounding the optical axis, said member being formed with an arcuate cutout; a pair of permanent magnets located in said cutout and spaced from each other, said magnets having concavely curved end faces directed toward each other; a bridging member fixed to said magnets and extending across the gap therebetween; a core carried by said bridging member in the space between said end faces of said permanent magnets; a moving coil supported by said core and bridging member for turning movement in the space between said end faces; an electrically non-conductive carrier fixed to said magnetic member and formed with a pair of notches which extend inwardly from outer peripheral portions of said non-conductive carrier, respectively, said carrier having a configuration conforming to that of said magnetic member along the portion of said magnetic member which is occupied by said non-conductive member; a pair of circular batteries located in said notches; a leaf spring fixedly carried by said carrier and having a pair of free ends pressing said batteries in a direction parallel to the optical axis and electrically connected thereto; and a photosensitive resistor also carrier by said electrically non-conductive carrier.

References Cited by the Examiner
UNITED STATES PATENTS

| | | | |
|---|---|---|---|
| 2,100,672 | 11/1937 | Riszdorfer | 95—64 |
| 2,163,737 | 6/1939 | Prinsen | 95—64 |
| 2,371,299 | 3/1945 | Johnson | 324—151 X |
| 2,465,970 | 3/1949 | Lamb | 88—23 |
| 3,211,071 | 10/1965 | Bolsey et al. | 95—10 X |

NORTON ANSHER, *Primary Examiner.*

JOSEPH F. PETERS, Jr., *Assistant Examiner.*